(12) United States Patent
Miyake et al.

(10) Patent No.: US 6,520,623 B2
(45) Date of Patent: *Feb. 18, 2003

(54) METHOD AND APPARATUS FOR PRINTING

(75) Inventors: Hiroyuki Miyake, Kawasaki (JP); Makoto Katsuma, Kawaguchi (JP)

(73) Assignee: Canon Kabushiki Kaisha

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/773,133

(22) Filed: Dec. 26, 1996

(65) Prior Publication Data

US 2001/0012031 A1 Aug. 9, 2001

(30) Foreign Application Priority Data

Dec. 28, 1995 (JP) .............................. 7-342198

(51) Int. Cl.⁷ ................................................. B41J 2/15
(52) U.S. Cl. ....................................................... 347/40
(58) Field of Search ............................. 347/40, 14, 19, 347/12, 13, 7, 41, 16; 400/124.07

(56) References Cited

U.S. PATENT DOCUMENTS

| 4,313,124 A | 1/1982 | Hara ............................. 347/5 |
| 4,345,262 A | 8/1982 | Shirato et al. ............... 347/10 |
| 4,459,600 A | 7/1984 | Sato et al. .................... 347/47 |
| 4,463,359 A | 7/1984 | Ayata et al. .................. 347/56 |
| 4,481,244 A | * 11/1984 | Haruta ....................... 428/155 |
| 4,521,123 A | 6/1985 | Boehmer |
| 4,558,333 A | 12/1985 | Sugitani et al. ............... 347/65 |
| 4,608,577 A | 8/1986 | Hori .............................. 347/66 |
| 4,712,172 A | * 12/1987 | Kiyohara et al. ............. 347/60 |
| 4,723,129 A | 2/1988 | Endo et al. .................... 347/56 |
| 4,740,796 A | 4/1988 | Endo et al. .................... 347/56 |
| 4,907,013 A | 3/1990 | Hubbard et al. |
| 4,963,882 A | 10/1990 | Hickman |
| 5,124,720 A | 6/1992 | Schantz |
| 5,430,469 A | 7/1995 | Shioya et al. |
| 5,619,233 A | * 4/1997 | Harrington .................... 347/40 |
| 5,682,183 A | * 10/1997 | Wade et al. ..................... 347/7 |
| 6,347,855 B1 | * 2/2002 | Takanaka ...................... 347/19 |

FOREIGN PATENT DOCUMENTS

| EP | 0348234 | 12/1989 |
| EP | 0378759 | 7/1990 |
| EP | 0 539 157 A2 | * 4/1993 | ............. B41J/2/21 |
| EP | 0558236 | 9/1993 |
| EP | 0559370 | 9/1993 |
| EP | 0568283 | 11/1993 |

(List continued on next page.)

OTHER PUBLICATIONS

"Ink Jet Printer Stitching Improvement", B. Kockler, vol. 4, No. 2, pp. 249–250, Xerox Disclosure Journal, Mar./Apr. 1979.

Primary Examiner—Michael Nghiem
(74) Attorney, Agent, or Firm—Fitzpatrick, Cella, Harper & Scinto

(57) ABSTRACT

A printing method which can complement an image defect caused by ejection failure and thus to obtain high definition image even when failure, such as faulty ejection or non-ejection failure, is caused in any of ejection mechanism as a plurality of printing elements of a printing head. The printing method includes step of detecting faulty nozzle of the printing head, step of performing printing excluding the faulty nozzle during primary scanning, step subsequently of providing a shift for the printing head in an auxiliary scanning direction at least a pitch between the nozzles, step of performing complemental printing with other normal nozzle for a printing region corresponding to the faulty nozzle which could not be printed in the printing step, and step of eliminating shift of the printing head in the auxiliary scanning direction.

38 Claims, 9 Drawing Sheets

FOREIGN PATENT DOCUMENTS

| | | | |
|---|---|---|---|
| EP | 0677390 | 10/1995 | |
| JP | 54056847 | 5/1979 | |
| JP | 59123670 | 7/1984 | |
| JP | 59138461 | 8/1984 | |
| JP | 60071260 | 4/1985 | |
| JP | 60-104338 * | 6/1985 | .............. B41J/3/04 |
| JP | 61-123545 | 6/1986 | |
| JP | 62053492 | 3/1987 | |
| JP | 63-067163 * | 3/1988 | .............. B41J/3/20 |
| JP | 63254050 | 10/1988 | |
| JP | 63260448 | 10/1988 | |
| JP | 2-194955 | 8/1990 | |
| JP | 3046589 | 7/1991 | |
| JP | 4-226772 | 8/1992 | |
| JP | 53-01340 | 11/1993 | |
| JP | 5301427 | 11/1993 | |
| JP | 6-79956 | 3/1994 | |
| JP | 6079956 | 3/1994 | |
| JP | 6-226982 | 8/1994 | |
| JP | 6-286254 | 10/1994 | |
| JP | 7-285225 A * | 10/1995 | .............. B41J/2/13 |
| JP | 80-25700 | 1/1996 | |
| WO | WO93/04443 | 3/1993 | |

\* cited by examiner

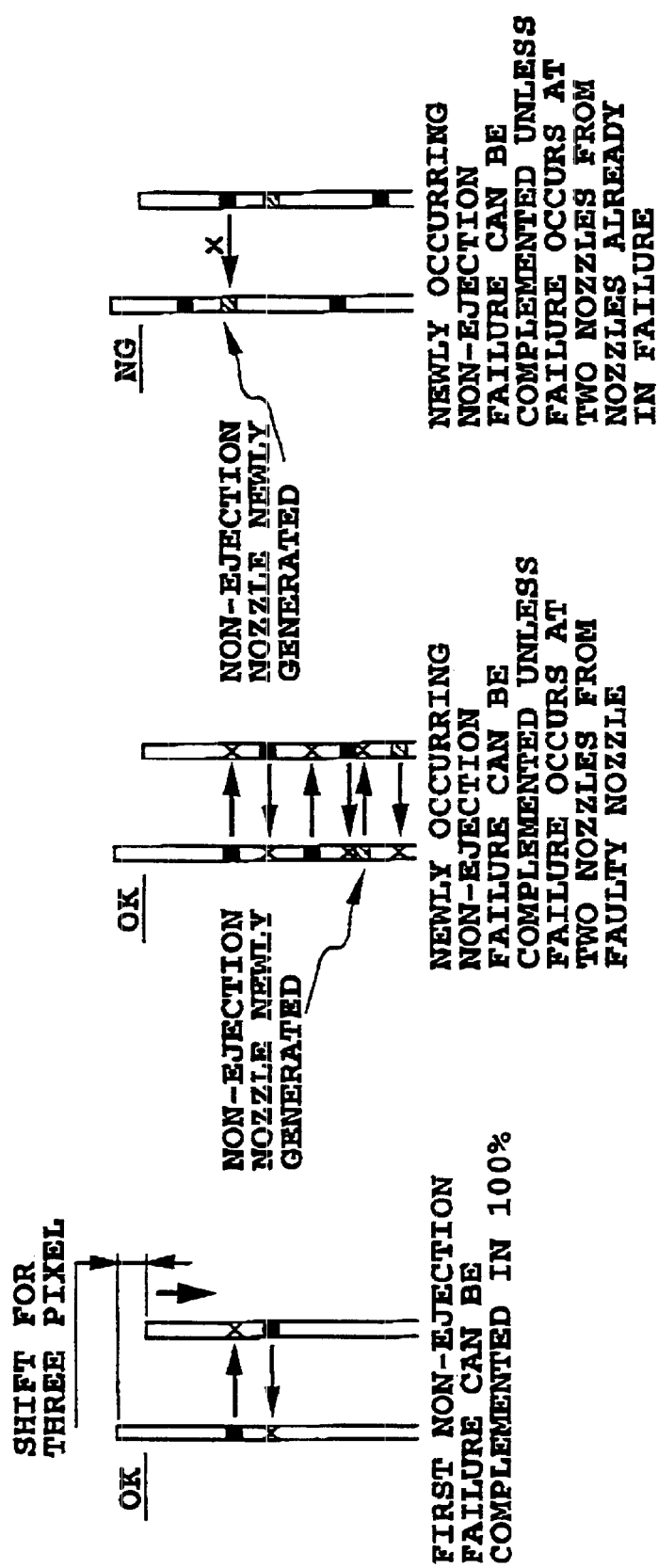

| FIG.5A | FIG.5B |

METHOD AND APPARATUS FOR PRINTING

BACKGROUND OF THE INVENTION

1. Field of the Invention

The present invention relates to a method and an apparatus for printing, in which a detect of an image due to faulty nozzle causing fluctuation or failure in ejection, can be complemented.

2. Description of the Related Art

An ink-jet type printing method is adapted to form an image of a printing medium by directly ejecting ink droplets onto the printing medium through a printing head located in opposition to the printing medium with a predetermined clearance. Different from electrophotographic or laser printing method or so forth, there are much lesser process and/or components required in formation of the image. Therefore, desired image can be stably obtained.

However, in the ink-jet printing method, there is an instability factor for formation of an image by ejecting fine ink droplets through ends (ejection openings) of a plurality of fine nozzles of a printing head. A phenomenon representative of such instability is fluctuation or failure in ejection for example. Failure of ejection can be caused by stopping the flow in the nozzle due to dust, ink of increased viscosity and so forth, breakage of heater in the nozzle, covering of the ejection opening of the nozzle by the ink droplet and so forth. Therefore, if ejection failure is caused in a part of the nozzles among a plurality of nozzles in the printing head, when the printing head is driven in a primary scanning direction with respect to the printing medium, a white line extending in the primary scanning direction should appear at the position of the printing medium corresponding to the faulty nozzles not ejecting the ink. Conventionally, once failure of ejection is caused in the printing head, it has been not possible to obtain an image having no defect.

The possibility of occurrence of failure in ejection is progressively increased in proportion to an increasing number of nozzles. Therefore, when the number of nozzles is increased to be several hundreds or several thousands for the purpose of speeding of printing, possibility of occurrence of the faulty nozzle is proportionally.increased. This makes it difficult to achieve high speed printing without causing defect on the printed image, On the other hand, in viewpoint of manufacturing of the printing head, conventionally, it is inherently required to produce the defect free printing heads, all of the nozzle of which are in normal condition. Thus, increasing of number of nozzles to be provided in one printing head should result in increasing of possibility of defects in the printing head and thus inherently results in lowering of yield in manufacturing. This inherently raises production cost of the printing head.

Furthermore, even when a defect free printing head is successfully produced, if failure of the nozzle is caused during use to.make ink ejection through such faulty nozzle unstable to degrade the obtained image. Therefore, such printing head with faulty nozzle becomes not possible to use and has to be exchanged. On the other hand, in four to eight color ink-jet printing apparatus employing four to eight printing heads, each having several thousands of nozzles, if failure is caused in one or more nozzles, defective print is produced at every time of occurrence of failure. Furthermore, at every occurrence of failure, the printing head has to be exchanged to inherently stop the overall printing apparatus. Therefore, the apparatus becomes not possible to operate stably.

As a solution for this, the applicant has proposed a printing method and a printing apparatus which can perform complementing printing for obtaining complete printing products even in presence of the faulty nozzle in the printing head, in Japanese Patent Application Laying-open No. 25700/1996. Namely, the proposed printing method performs auxiliary scanning for the printing medium by an auxiliary scanning means for a magnitude smaller than an arrangement length of printing elements (nozzles) in the printing head after completion of primary printing scan by a primary scanning means with shifting of the printing head relative to the printing medium, so that the complemental printing for the printing region where printing has not been performed in the preceding primary scanning cycle due to failure of the printing element with other printing element during returning of the printing head to an initial position for the next primary scanning operation.

With such innovative printing method, the non-printed portion can be complementally printed so that a complete printing product can be obtained even when the faulty nozzle is present in the printing head.

However, such printing method still maintains rooms for improvement as claimed below.

(1) It is inherent to change flow of complemental printing when non-printing failure is caused on the nozzle located at certain positions among a plurality of nozzles in the printing head. For instance, when the faulty nozzle is located at a lower end of an array of a plurality nozzles in the auxiliary scanning direction, complemental print for a complementally printing defect caused by such faulty nozzle cannot be performed by a flow for complementally printing adapted for shifting in the downstream side in the auxiliary scanning direction. Therefore, in such case, the flow has to be changed to a flow for causing shift in the upstream side.

(2) On the other hand, the width of the image corresponding to the width of the array of the nozzles in the printing head is varied. The auxiliary scanning width for complementally printing is also varied. Therefore, the data unit of the image to be handled is varied.

(3) Since feeding amount in the auxiliary scanning direction for complementally printing is not constant.

(4) There are the foregoing problems in the items (1) to (3) which are mutually correlated to obtain satisfactory or complete complemental function, when the principle of complemental printing is applied for a color printing apparatus having a plurality of printing heads.

(5) It is difficult to accurately perform auxiliary scan of the printing medium in the extent corresponding to one or several pixels. Particularly, in case of a large scale apparatus, such as a printing apparatus performing textile printing in ink-jet system, in which a construction for transporting a cloth as the printing medium with an endless belt of about 1.8 m width becomes necessary. It is quite difficult or even impossible to provide a fine shift in the extent of several tens $\mu$m corresponding to one pixel. If overrunning is caused by excessive shift of the printing medium, it has been necessary to stop at the target position by several times of reciprocating shift, or to shift in large extent back to the original position to again shift for one pixel to reach the target position. Thus, feeding operation for complementing printing becomes too complicate.

SUMMARY OF THE INVENTION

In a first aspect of the present invention, there is provided a printing apparatus, comprising:

primary scanning means for performing primary scan of a printing head relative to a printing medium, the printing head having a plurality of printing elements arranged;

printing head driving means for driving the printing elements of the printing head, during primary scan of the printing head by the primary scanning means, to form an image on the printing medium;

auxiliary scanning means for performing auxiliary scanning of the printing head in a direction substantially perpendicular to the scanning direction of the primary scanning means, relative to the printing medium; and printing control means, at a printing region of the printing medium corresponding to the printing element of the printing head which cannot perform printing in a forward direction of the primary scan, for performing complementally printing by another printing element in a condition where the printing head and the printing medium are relatively shifted in the direction of auxiliary scan at least a pitch between the printing elements of the printing head, and then performing next printing in a condition where the shifting of the printing head and the printing medium in the direction of the auxiliary scan be eliminated.

Here, it may further comprise shifting means for shifting the printing head relative to the printing head in the auxiliary scanning direction, wherein the shifting of the printing head in the auxiliary scanning direction, wherein the shifting of the printing head in the auxiliary scanning direction depending upon the pitch between the printing elements is performed by the auxiliary scanning means.

According to the above invention, it is possible to perform a printing head in the auxiliary scanning direction by only a predetermined fine distance. Therefore, a non-printed portion on the printing medium caused by the faulty nozzle of the printing head can be accurately printed by the other normal nozzle without any failure, and a defect image including the non-printed portion can be complemented.

In the above invention, the printing elements of the printing head may be arranged along the auxiliary scanning direction. The printing head may also perform printing in a width corresponding to a length of a printing element array excluding at least one of opposite ends of the array of the printing elements.

According to the above invention, even when the faulty causes at a printing element positioned at ends of the array of the printing elements, it is possible to accurately shift the printing head in the auxiliary scanning direction, and accordingly the defect image including the non-printed portion of the printing medium caused by an abnormal printing element on a forward primary scan can correspond to the normal printing element of the printing head. Therefore, the non-printed portion can be complementally printed on a backward primary scan by the other normal printing element.

In the above invention, it may further comprise abnormality detecting means for detecting an abnormal printing element among printing elements of the printing head. The printing head may have ink ejection openings for ejecting ink corresponding to the plurality of printing elements, and within each of the ejection openings, ejection means for ejecting ink is provided.

According to the present invention, abnormality of the printing element can be rapidly detected. Therefore, complement of defect image on the printing medium caused by the abnormal printing element can be smoothly performed.

In the above invention, the ejection means may be an electrothermal energy transducer applying a thermal energy for the ink, and causing state variation is the ink by the heat for ejection of the ink. A cloth may be used as the printing medium.

In a second aspect of the present invention, there is provided a printing apparatus including:

primary scanning means for performing primary scan of a printing head relative to a printing medium, the printing head having a plurality of printing elements arranged;

printing head driving means for driving the printing elements of the printing head, during primary scan of the printing head by the primary scanning means, to form an image on the printing medium; and auxiliary scanning means for performing auxiliary scanning of the printing head in a direction substantially perpendicular to the scanning direction of the primary scanning means, relative to the printing medium, the printing method, comprising the steps of:
  printing with excluding a printing element which caused failure, among a plurality of printing elements upon printing scan in a forward direction by the printing head driven for the primary scanning;
  shifting the printing head relative to the printing medium in the direction of auxiliary scan at least a pitch between the printing elements of the printing head, after the previous printing step is performed;
  complementally printing at a printing region of the printing medium corresponding to the printing element of the printing head which cannot perform printing in a forward direction of the primary scan, by another printing element in a condition where the printing head and the printing medium are relatively shifted by the previous shifting step; and
  eliminating the shift in the auxiliary scanning direction between the printing head and the printing medium for next printing scan.

Here, the shifting of the printing head in the auxiliary scanning direction depending upon the pitch between the printing elements, may be performed by the auxiliary scanning means.

According to the present invention, the defect image generated by abnormal printing element detected at the detection step can be complementally printed after shifting the printing head relative to the printing medium in the auxiliary scanning direction at the auxiliary scanning step. In this case, since the shift can be more accurately performed than a case the printing medium is shifted, the complement of the defect image can be easily performed. In order to complement the defect image on the printing medium, only the printing head is scanned in the auxiliary scanning direction, and the printing medium is however scanned in the auxiliary scanning direction only the case where the usual printing is performed. Therefore, shift of the printing medium is always constant.

In the above invention, the printing step may be performed on the basis of an image data excluding image data segment corresponding to a faulty printing element when failure caused on the faulty printing element is not non-ejecting failure.

When the faulty of the abnormal printing element is non-ejection, a white line as non-printed portion is formed. According to the above invention, even if the faulty of the abnormal printing element is not non-ejection, the white line can be formed on the printing medium by excluding image data segment corresponding to the faulty printing element. Therefore, the flow of the complemental printing step can be performed at a constant, and the apparatus becomes simple.

In the above invention, the complemental printing step may be performed by reading out an image for the faulty printing element excluding in the printing scan in forward direction.

According to the above invention, since the defect image generated on the forward primary scan can be complementally printed on the backward primary scan, it is possible to prevent ink from overlapping on the printing medium.

In the above invention, the shifting step may include judgment step after providing shift in the auxiliary scanning direction for the printing head, the judgment step for making judgment whether other printing element in failure is opposed to the printing region on the printing medium corresponding to the faulty printing element of the printing head which cannot perform printing the printing scan in the forward direction.

According to the above invention, it is possible to check the normal printing element faces to the defect image as non-printed portion of the printing medium by fine shifting in the auxiliary scanning direction. Furthermore, it is possible to certainly judge the possibility of the complemental printing.

In the above invention, the complemental printing step is performed according to the judgment step when ink ejection is possible for the printing region on the printing medium corresponding to the faulty printing element of the printing head which cannot perform printing the printing scan in the forward direction.

The complemental printing step may be stopped on the basis of the judgment step when ink ejection is not possible for the printing region on the printing medium corresponding to the faulty printing element of the printing head which cannot perform printing the printing scan in the forward direction.

Stopping of the complemental printing step may be followed by a warning.

The complemental printing step may be further performed when ink ejection is not possible for the printing region on the printing medium corresponding to the faulty printing element of the printing head which cannot perform printing the printing scan in the forward direction.

The printing head may have ink ejection openings for ejecting ink corresponding to the plurality of printing elements, and within each of the ejection openings, ejection means for ejecting ink is provided.

The ejection means may be an electrothermal energy transducer applying a thermal energy for the ink, and causing state variation in the ink by heat for ejection of the ink.

A cloth may be used as the printing medium.

According to the above invention, since the simple flow for complement of the defect image is employed, even if any of ejection means as a plurality of printing elements causes the fault such as poor-ejection or non-ejection failure, a non-printed portion on the printing medium can be printed by a normal printing element, and an image defect caused by such failure can be complemented to obtain an high definition image.

In a third aspect of the present invention, there is provided a printing apparatus, comprising:
primary scanning means for performing primary scan of a printing head relative to a printing medium, the printing head having a plurality of printing elements arranged;
printing head driving means for driving the printing elements of the printing head, during primary scan of the printing head by the primary scanning means, to form an image on the printing medium;
shifting means for shifting the printing head in a direction substantially perpendicular to the scanning direction of the primary scanning means, relative to the printing medium; and
printing control means, at a printing region of the printing medium corresponding to the printing element of the printing head which cannot perform printing in a forward direction of the primary scan, for performing complementally printing by another printing element in a condition where the printing head and the printing medium are relatively shifted by the shifting means at least a pitch between the printing elements of the printing head, and then performing next printing in a condition where the shifting of the printing head and the printing medium in the direction of the auxiliary scan be eliminated.

In a fourth aspect of the present invention, there is provided a printing method in a printing apparatus including:
primary scanning means for performing primary scan of a printing head relative to a printing medium, the printing head having a plurality of printing elements arranged;
printing head driving means for driving the printing elements of the printing head, during primary scan of the printing head by the primary scanning means, to form an image on the printing medium; and
shifting means for shifting the printing head in a direction substantially perpendicular to the scanning direction of the primary scanning means, relative to the printing medium;
the printing method, comprising the steps of:
printing with excluding a printing element which caused failure, among a plurality of printing elements upon printing scan in a forward direction by the printing head driven for the primary scanning;
shifting the printing head relative to the printing medium by the shifting means at least a pitch between the printing elements of the printing head, after the previous printing step is performed;
complementally printing at a printing region of the printing medium corresponding to the printing element of the printing head which cannot perform printing in a forward direction of the primary scan, by another printing element in a condition where the printing head and the printing medium are relatively shifted by the previous shifting step; and
eliminating the shift in the auxiliary scanning direction between the printing head and the printing medium for next printing scan.

The above and other objects, effects, features and advantages of the present invention will become more apparent from the following description of embodiments thereof taken in conjunction with the accompanying drawings.

BRIEF DESCRIPTION OF THE DRAWINGS

FIGS. 4A to 4C are identical views to FIGS. 3A to 3C except for shifting by three nozzle pitch of the printing head, wherein FIG. 4A is a plan view diagrammatically showing shifting for three nozzle pitch of a printing head when only one faulty nozzle is present in an array of normal nozzles of the printing head; FIG. 4B is a plan view diagrammatically showing shifting for three nozzle pitch of a printing head when failure is caused in the second nozzle in an array of normal nozzles of the printing head; and FIG. 4C is a plan view diagrammatically showing shifting for three nozzle pitch of a printing head when failure is caused in the third nozzle in an array of normal nozzles of the printing head;

DETAILED DESCRIPTION OF THE PREFERRED EMBODIMENT

The preferred embodiments of the present invention will be discussed hereinafter in detail with reference to the accompanying drawings.

FIGS. 1A to 1G are plan views showing in respective steps of a printing method according to the present invention.

Figure 1A:
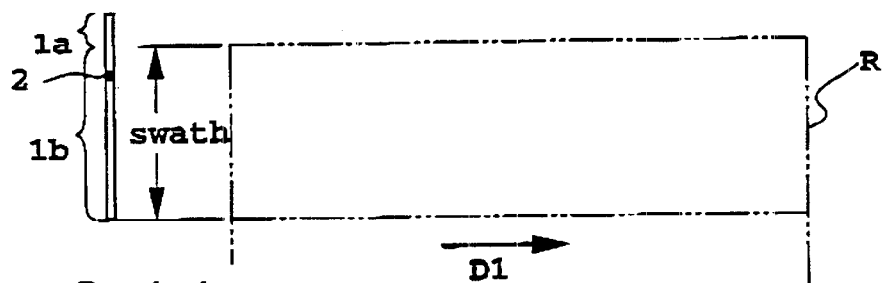
FIGS. 1A to 1G are plan views showing respective steps of an embodiment of a printing method according to the present invention.

In FIG. 1A, the reference numeral 1 denotes a diagrammatically illustrated printing head, in which a plurality of printing elements are arranged. In the shown embodiment, the printing head 1 is a multi-nozzle head, in which a plurality of nozzles are arranged in lengthwise direction (vertical direction in the drawing: auxiliary scanning direction) of the printing head, and is designed to perform printing with shifting in a direction perpendicular to the lengthwise direction (primary scanning direction: in a direction of arrow D1 in FIG. 1A). The upper end portion 1a of a nozzle array in the printing head 1 is set as a auxiliary nozzle array to be not used in normal printing operation, and is used for complement of an image defect caused by faulty nozzle as the printing element at the end of the nozzle array other than the auxiliary nozzle 1a array causing failure, such as non-ejection failure and so forth. Normal printing operation is performed with the nozzle array 1b other than the auxiliary nozzle 1a (which nozzle array to be used in the normal printing will be hereinafter referred to as "normal printing nozzle array"). The printing width (shown as "swath" in FIG. 1A) is always constant. Printing by the normal printing nozzle array 1b is performed in a printing region R.

It should be noted that, while the auxiliary nozzle 1a is set only in the upper end portion in the shown embodiment, the arrangement of the auxiliary nozzle 1a is not limited to the shown arrangement but can be set at the lower end portion or at both of the upper and lower end portions.

In the first step of the printing method employing such printing head 1, check is performed whether a faulty nozzle 2 causing abnormality in formation of image is present in the normal printing nozzle array 1b or not. Here, abnormality in formation of image may include fluctuation of ejection, ejection of excessively large or small dot and so forth in addition of non-ejection failure. The faulty nozzle may be detected by detecting white line or non-printed portion appearing on the. printing medium after primary scanning printing. It is also possible to provide temperature sensors in respective nozzles in the printing head and thus monitor temperature variation in respective nozzles to check variation of ejection performance of respective nozzles to detect the faulty nozzle. Namely, when ejection performance is lowered, ink heated in the nozzle cannot be ejected sufficiently through the ejection opening and temperature in the nozzle immediately after ink ejection is not lowered sufficiently as that in other nozzles operating normally. Therefore, by numerically detecting the temperature variation in the nozzles, the position of the faulty nozzle can be appropriately and certainly identified.

On the other hand, with respect to the nozzle causing failure, it may detect failure by optically checking whether the ink droplet is ejected or not. The present invention is directed to a construction for performing complemental printing in a separate step to the normal printing scan by specifically identifying the nozzle causing failure. Therefore, the invention should not be limited to the step of detection of the faulty nozzle.

Figure 1B:
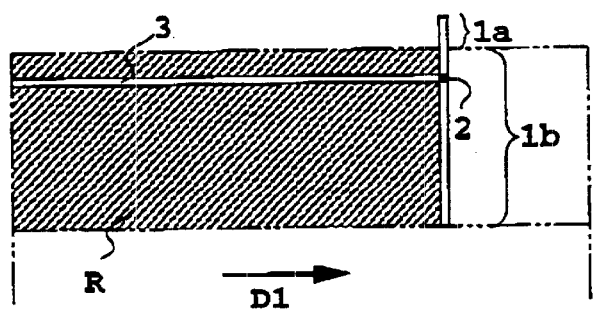
Figure 1C:
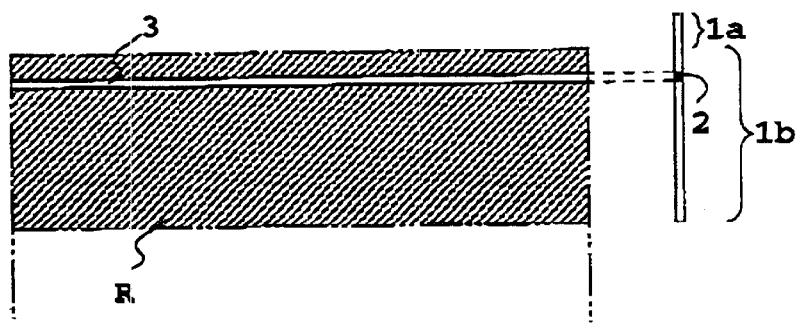

After identifying the position of the nozzle, on which failure is detected in the foregoing detection state, as shown in FIG. 1B, a printing step is performed for printing the image data excluding the image data corresponding to the faulty nozzle. Here, if the faulty nozzle completely fails to eject the inks, ink will never be ejected through such faulty nozzle. Therefore, in such case, it is not necessary to exclude the image data corresponding to the faulty nozzle. In the image of the row corresponding to the image data corresponding to the faulty nozzle and thus being excluded from printing, a white line 3 is formed as shown in FIG. 1C.

Figure 1D:
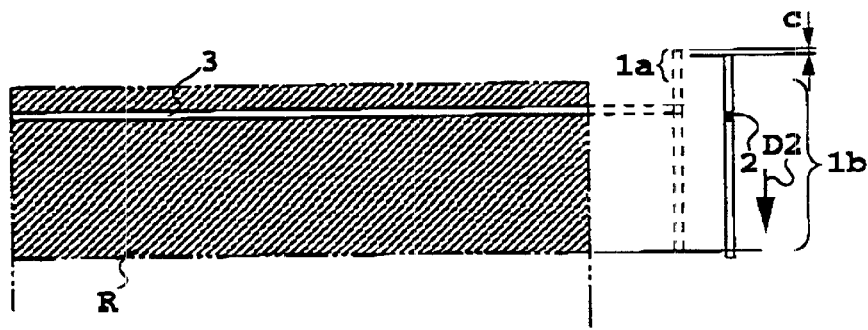

Next, as shown in FIG. 1D, by shifting the printing head 1 in the auxiliary scanning direction (direction shown by arrow D2 in FIG. 1D) for a pitch between adjacent nozzles, a normally operating nozzle in the normal printing nozzle array 1b located adjacent to the faulty nozzle 2 is opposed to the position where the white line is formed in the immediately preceding scan in the primary scanning direction. For example, when the printing head has a dot density of 360 dpi, the foregoing shifting amount in the auxiliary scanning direction becomes ⅟360 inches. Accordingly, such shifting amount is fine, such shifting operation may be performed quickly at high precision. Here, the auxiliary scanning step, the printing head is shifted in the direction of the arrow D2 for one nozzle pitch. Then, among the nozzles in the auxiliary nozzle array a1 adjacent to the nozzle in the normal printing nozzle array 1b before shifting, is included in the normal printing nozzle array 1b.

Figure 1E:
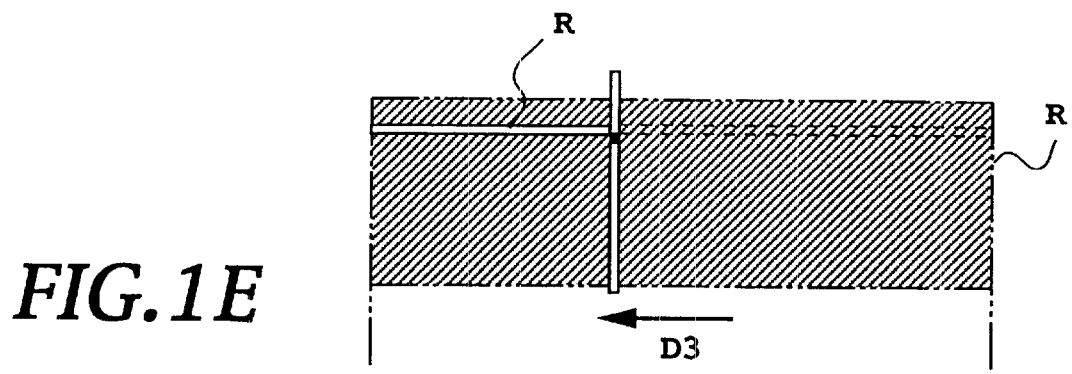
Figure 1F:
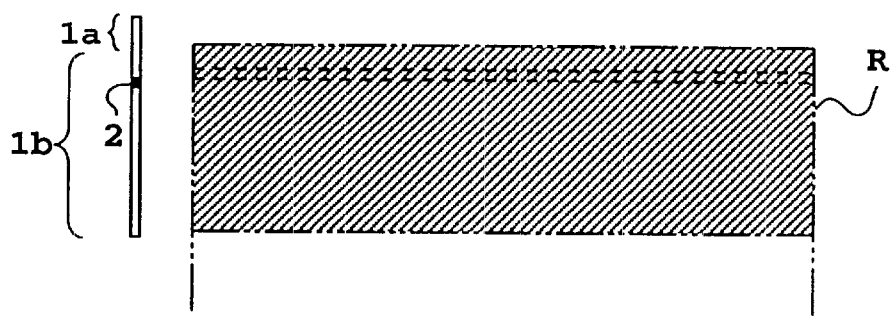

Next, as shown in FIG. 1E, an auxiliary printing step is performed for printing only image data segment corresponding to the region of the white line 3 excluded in the normal printing step as claimed above. Namely, by shifting the printing head 1 in the direction of an arrow D3 (opposite direction to that of the arrow D1). Thus, the image of excluded the image data fraction is printed by the normally operating nozzle located at the position corresponding to the region of the white line 3 caused by the faulty nozzle 2.

Figure 1G:
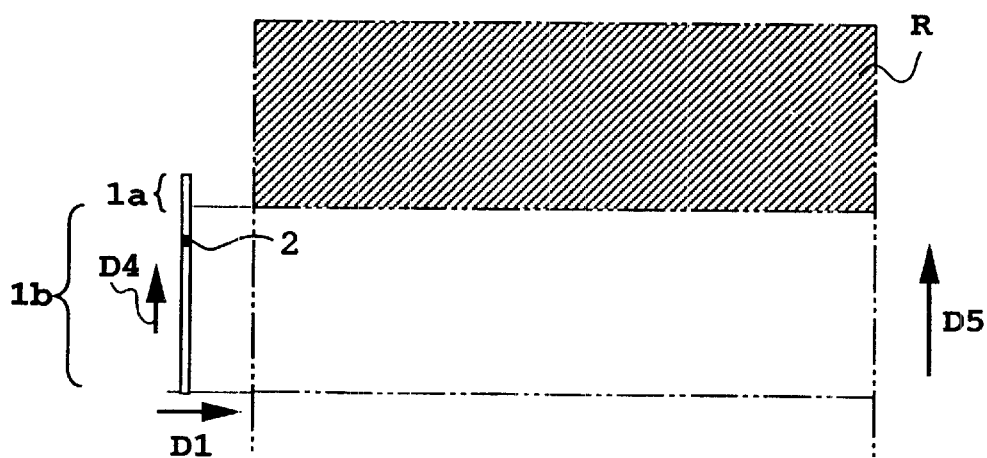

By performing complemental printing in the manner set forth above, the defect of the printed image in a form of the white line is eliminated from the image in the printing region R printed by the normal printing nozzle of the printing head 1F. Thus, the high definition image completely corresponding to the image data can be obtained. Next, as shown in FIG. 1G, the printing head 1 shifted during the foregoing auxiliary scanning step is shifted back to the original position. Also, in conjunction therewith, by the auxiliary scan of the printing medium in the auxiliary direction by the auxiliary scanning means not shown, the printing head is fed for one line in the auxiliary scanning direction (direction of an arrow D5). The feeding amount for one line corresponds to a length of the normal printing nozzle 1b of the printing head 1 in the auxiliary scanning direction.

Then, for next primary scanning printing, the foregoing series of steps are repeated.

In the shown embodiment, discussion has been given in the case where failure in ejection is caused in only one of the nozzle among the nozzles in the normal printing nozzle array 1b of the printing head 1. Here, attention should be attracted so that even when failure of the nozzle at any position in the normal printing nozzle, the defect of the printed image due to the faulty nozzle can be complemented by complement printing with another nozzle in the same printing head. Namely, by providing the auxiliary nozzle array 1a at the end portion of the normal printing nozzle array 1b, it becomes possible to oppose a normally operating nozzle to the defective image portion by shifting the printing head in the auxiliary scanning direction for complement. Thus, complemental printing can be performed with another nozzle of the same printing head, in which the faulty nozzle is present.

In the above discussion employing FIGS. 1A to 1G, discussion has been given for the complement printing method in the case where failure is caused in only one nozzle in the nozzles of the normal printing nozzle array 1b of the printing head 1, the present invention is applicable to the case where failure is caused in a plurality of nozzles in the normal printing nozzle array 1b in the printing head. The complemental printing method for such case will be discussed hereinafter in detail with reference to FIG. 2. It should be noted that like components of the printing head shown in FIGS. 1A to 1G will be identified by like reference numerals and detailed discussion for such common components will be omitted for keeping the disclosure simple enough to facilitate clear understanding of the present invention.

Figure 2:
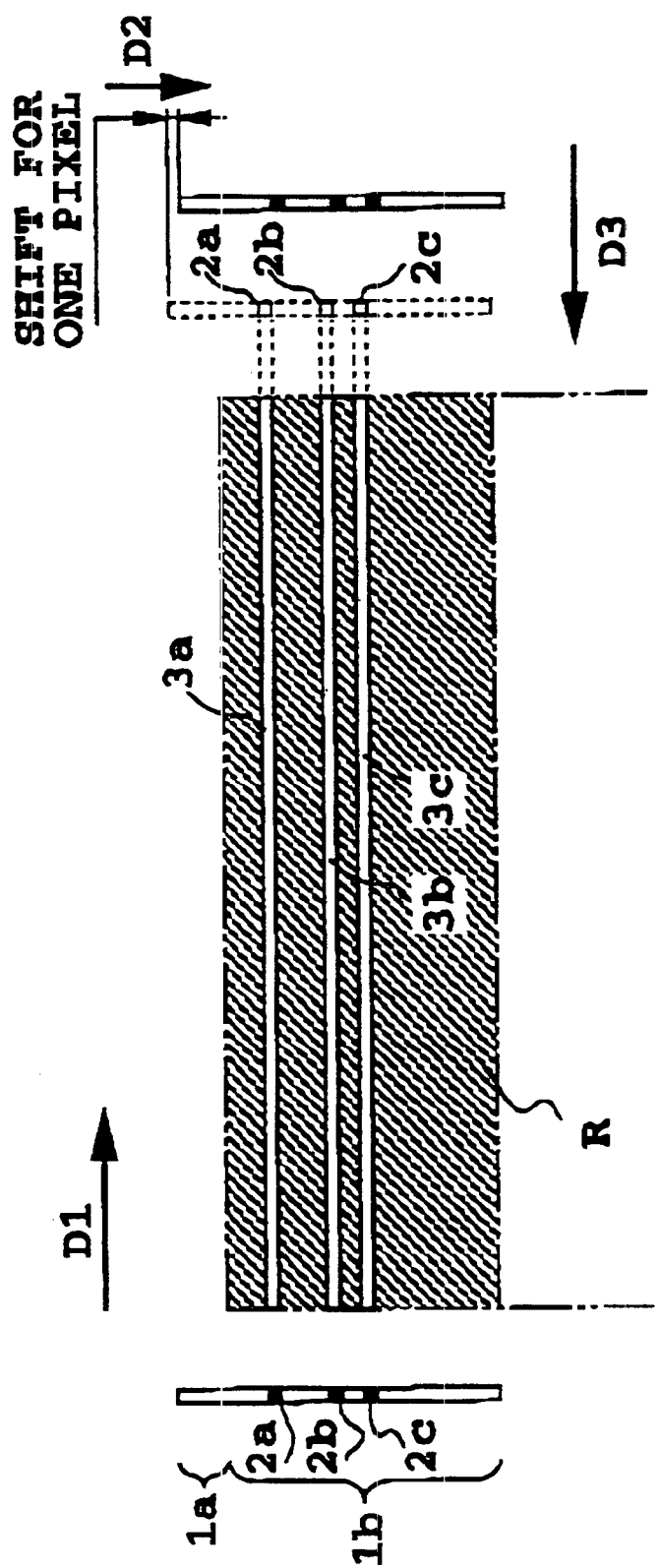
FIG. 2 is a plan view showing the printing method according to the present invention.

As shown in FIG. 2, in the normal printing nozzle 1b of the printing head 1, it is assumed that failure is caused in three nozzles 2a, 2b and 2c. In such case, complemental printing is performed in the following manner. Namely, occurrence of failure in ejection is checked in advance of primary scanning print and whereby the positions of the faulty nozzles 2a, 2b and 2c are known before primary scanning printing. Then, in the primary scanning printing, the predetermined image is formed or printed on the printing medium by shifting the printing head 1 in the direction of arrow D1. In this case, when image data for ejecting the ink through the faulty nozzle is present, the image data corresponding to the faulty nozzles is eliminated from the image data to be fed to the printing head 1 during normal printing. Thus, faulty nozzles are expressed by the while lines on the obtained printed image. Similarly to the foregoing, when failure of the faulty nozzle is completely non-ejection, it may not be necessary to remove the image data corresponding thereto, since the image may not be printed in any way to form the white line. Next, by shifting the printing head 1 in the direction of arrow D2 for one nozzle pitch, normally operating nozzles are opposed to positions corresponding to the white lines 3a, 3b and 3c. Then, by shifting the printing head 1 shifted in the predetermined magnitude in the auxiliary scanning direction, in the direction of an arrow D3, the image data excluded in the normal printing is fed to the normally operating nozzles opposing to the white lines 3a, 3b and 3c for ink ejection only on the white lines 3a, 3b and 3c to perform complemental printing.

As described above, discussion has been given for complemental printing method for the case where a plurality of faulty nozzles are present in the normal printing nozzle array. However, as will be clear from the discussion given above, complemental printing is also applicable to the case where a plurality of faulty nozzles in the printing head case as well as the case where only one faulty nozzle in the printing head causes. Namely, the printing method according to the present invention features in that complemental printing for the image defect can be performed by the same operation irrespective of the position of the faulty nozzle or irrespective of number of the faulty nozzles. On the other hand, the printing method according to the present invention also features in that the printing head occurring failure, for example the multi-nozzle head may perform complemental operation by itself.

Furthermore, even in the case where the printing method of the present invention is applied for an image forming apparatus having a plurality of printing heads, such as a color printing apparatus, or for an ink-jet textile printing apparatus having two printing stations, such as that disclosed in commonly owned Japanese Patent Application Laying-open No. 301340/1993, complemental printing can be performed by shifting a head carriage mounting a plurality of printing heads in the auxiliary scanning direction without causing mutual interference of complemental operation of respective printing heads.

In such printing method, high definition complementally printing which cannot be achieved in the prior proposed technology can be achieved with a simplified flow. It should be noted that while a method to individually shift a plurality of printing heads can be considered, it may not be practical for making the apparatus complicate, lowering of precision, and increasing of cost.

Next, in the embodiment as explained previously, the printing head 1 is shifted in the auxiliary scanning direction for one nozzle pitch during auxiliary scanning step for complement. Certainty of success of complement in such complementally printing method is calculated.

Figures 3A, 3B, 3C:
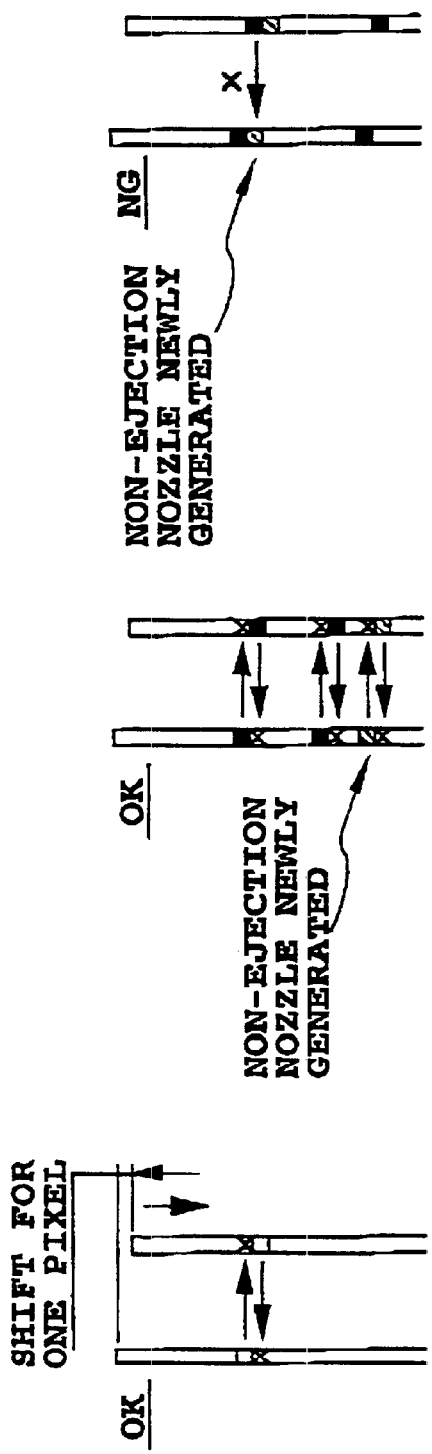
FIG. 3A is a plan view diagrammatically showing shifting for one nozzle pitch of a printing head when only one faulty nozzle is present in an array of normal nozzles of the printing head.
FIG. 3B is a plan view diagrammatically showing shifting for one pitch between nozzles of a printing head when failure is caused in the second nozzle in an array of normal nozzles of the printing head.
FIG. 3C is a plan view diagrammatically showing shifting for one nozzle pitch of a printing head when failure is caused in the third nozzle in an array of normal nozzles of the printing head.

FIG. 3A is a plan view diagrammatically showing displacement for one nozzle pitch of the printing head in the case where failure is caused in only one nozzle in the normal printing nozzle array 1b of the printing head 1. In this case, since failure is caused in only one nozzle, certainty of success of complement is 100%. Namely, for the first occurrence of failure, such as non-ejection or so forth, among number of nozzles (m) of the objective normal printing nozzle array 1b, there is no portion which cannot be complemented at the occurrence of failure, the certainty is 0/m. Accordingly, complemental success certainty is expressed by $$1-(0/m)=1 \tag{1}$$

Thus, the certainty becomes 100%.

FIG. 3B is a plan view diagrammatically showing shifting of the printing head for one nozzle pitch in the case where failure is caused in the second nozzle in the normal printing nozzle array 1b of the printing head 1. In this case, since the printing head is next shifted for one nozzle pitch, if the two nozzles adjacent the nozzle which becomes faulty at first, the normally operating nozzle cannot be placed in opposition to the white strip portions to make complement impossible. In this case, when two of the number of the objective nozzle (m−1) causes non-ejection failure, complement become impossible. Therefore, certainty of success of complement becomes 2/((m−1). Therefore, complemental success certainty is expressed by:

$$1-\{2/(m-1)\}=(m-3)/(M-1) \quad (2)$$

FIG. 3C is a plan view diagrammatically showing shifting of the printing head for one nozzle pitch in the case where failure is caused in the third nozzle in the normal printing nozzle array $1b$ of the printing head $1$. When 2×2 portions of nozzles adjacent two faulty nozzles causes failure, complement become impossible. Then, certainty of incapability of complement becomes 2×2/(m−2). Accordingly, complemental success certainty is expressed by:

$$1-\{2\times 2/(m-2)\}=(M-6)/(m-2) \quad (3)$$

Consideration is given for further expansion of failure, (n−1) in number of faulty nozzles are already present, and $n^{th}$ faulty nozzle is caused, at this stage, if failure is caused in 2×(n−1) portions adjacent the faulty nozzles, complement becomes impossible. Failure is caused at positions adjacent to faulty nozzles at (n−1) positions among {m−(n−1)} in number of objective nozzles. Then, certainty of incapability of complement becomes 2×(n−1)/{m−(n−1). Accordingly, complemental success certainty is expressed by:

$$1-2\times(n-1)/\{m-(n-1)=\{m-3\ (n-1)\}/\{m-(n-1)\} \quad (n)$$

If applied to a printing apparatus with one printing head, for example, to B/W printer, even if failure is caused for n in number of nozzles, certainty to normally perform complemental printing is:

$$(1)\times(2)\times(3)\times \ldots \times(n)$$

When the color printing apparatus having k in number of printing head is applied, the certainty of success of complemental printing even when failure is caused in n in number of nozzles in respective head is:

$$\{(1)\times(2)\times(3)\times \ldots \times(n)\}^k \quad (A)$$

In concrete, when the printing method according to the present invention is applied to the color printing apparatus of four colors (k=4), assuming that number of nozzles of normal printing nozzle array of the printing head is m=1400, and further assuming that number of heads is five (n=5), when certainty of complement printing is calculated with replacing respective data to the foregoing equal A, 0.944 can be obtained. Namely, this means that even when printing operation is continued until failure is caused on respective five nozzles in the four heads in the four color printing apparatus, i.e. twenty nozzles in total, possibility of continuing of printing of successfully complemented normal image can be 94.4%. In actual operation, maintenance, such as checking of non-ejection condition of respective printing heads, replacing of the printing head having large number of faulty nozzles with new printing head, may be performed in advance of starting operation. For example, even when failure is newly caused on 20 nozzles through one month of continuous operation, operation can be continued in the certainty of 94.4%. After one.month of continuous operation, maintenance may be performed for checking faulty condition of respective printing heads. Therefore, it becomes unnecessary to stop operation of the overall apparatus upon occurrence of non-ejecting failure on one ejection nozzle to replace the printing head with normal one. Therefore, it becomes unnecessary to reserve a staff for such replacement operation.

It should be noted that while the present embodiment is constructed to shift the printing head for one nozzle pitch for complement, if tendency to cause failure on the nozzle located adjacent to the faulty nozzle on which failure is already caused, the shifting magnitude of the printing head may be increased to be greater than one nozzle pitch.

FIGS. 4A to 4C correspond to FIGS. 3A to 3C except for shifting the printing head for three nozzle pitch in the auxiliary scan direction. It should be noted that complement becomes impossible in the construction of the resent embodiment when failure is caused on the nozzle located and distanced from the already failed faulty nozzle for two nozzle pitches, since the shifting magnitude of the printing head is for three nozzle pitches.

In the present embodiment, the auxiliary nozzle array $1a$ of the printing head $1$ is provided at the upper end portion of the normal printing nozzle array $1b$, it can be provided at the lower end portion or both of the upper and lower end portions. It should be noted that when complement is attempted by the auxiliary nozzle array at the upper end portion of the normal printing nozzle array $1b$ by providing both ends, and failure is caused at that portion, it may be possible to complement another auxiliary nozzle provided at the lower end portion of the normal printing nozzle array $1b$.

Figure 5:
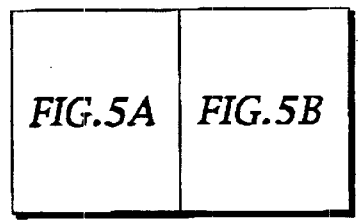
FIGS. 5, 5A and 5B are flowcharts for explaining a relationship between respective steps in the printing method according to the invention.
Figure 5A:
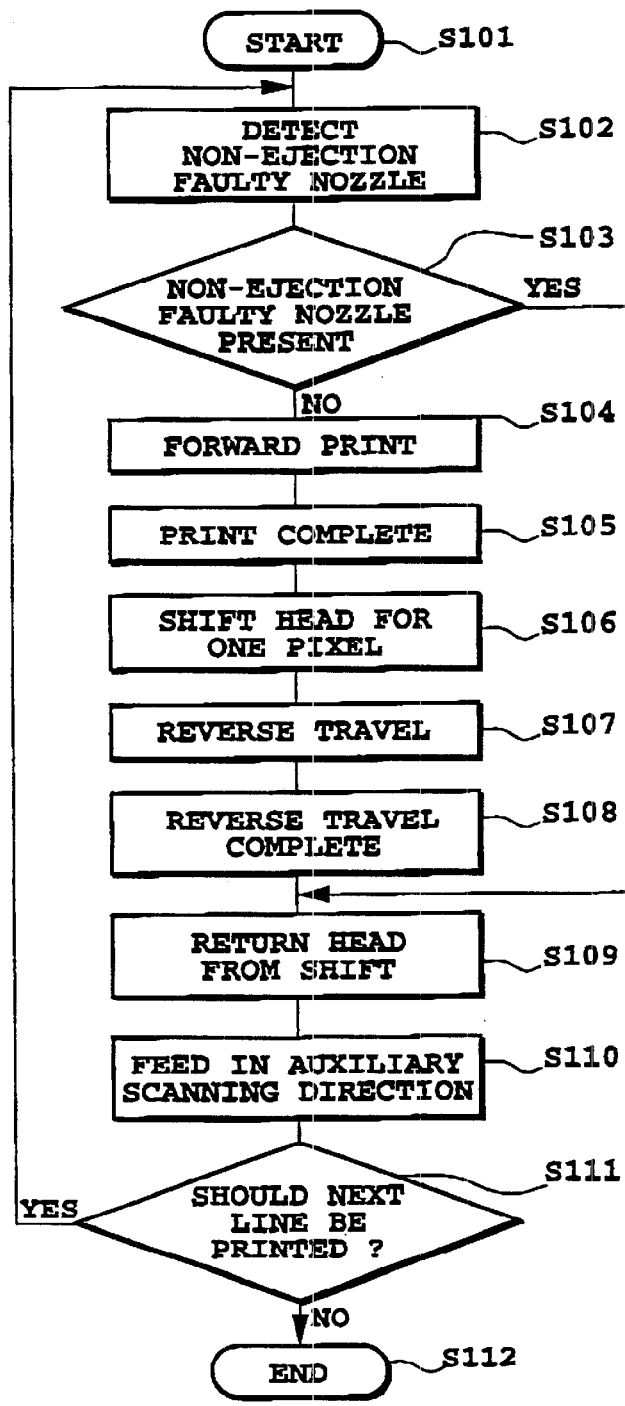
Figure 5B:
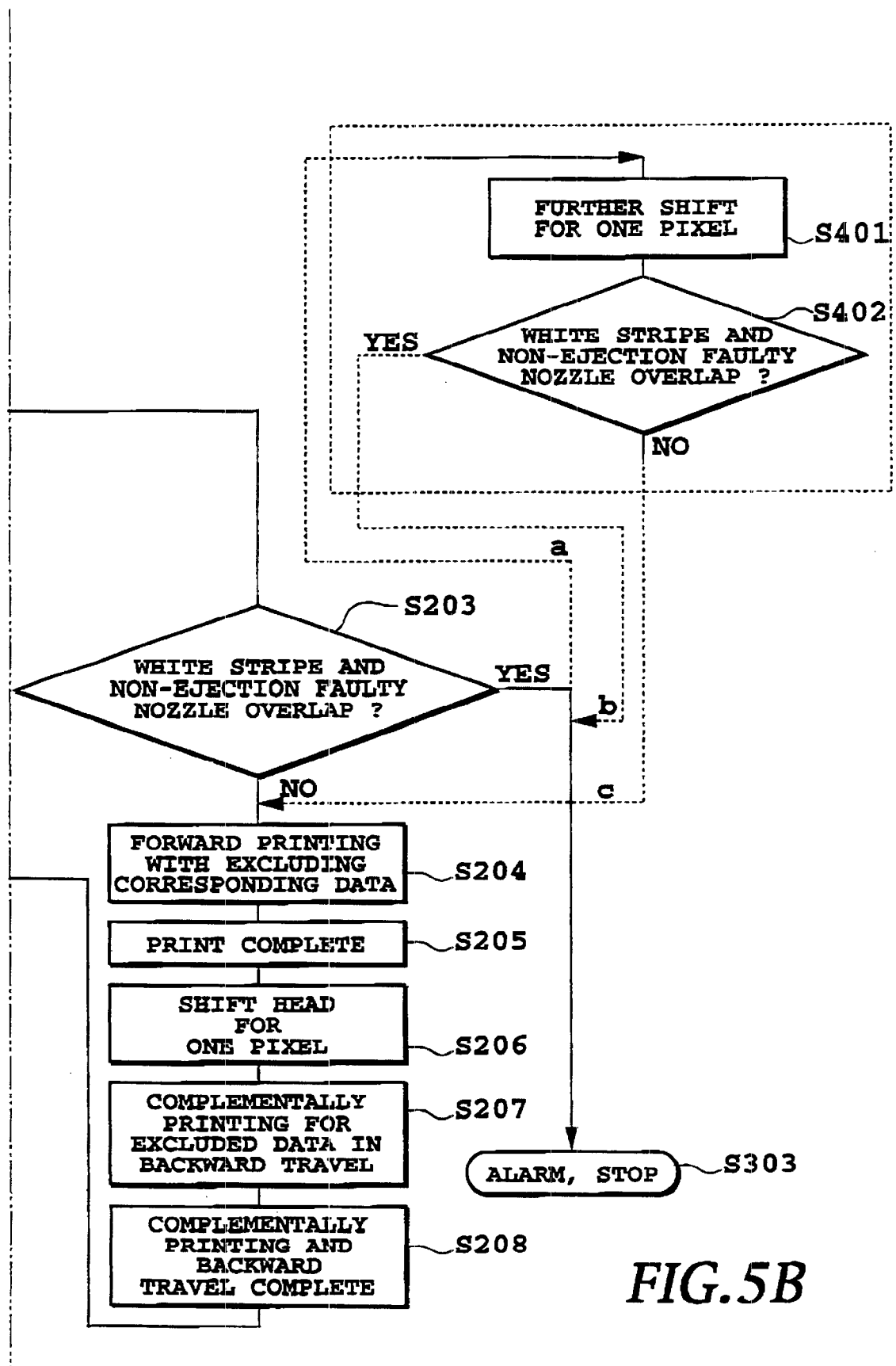

FIGS. 5A and 5B are flowcharts for explaining a relationship between respective steps in the printing method according to the present invention. As shown in FIG. 5A, upon turning ON of power supply for the printing apparatus (S101), check is performed whether failure, such as non-ejection failure, is caused in the nozzles of the normal printing nozzle array (S102), and judgment of fault is made (S103).

Here, if the faulty nozzle is present, and when the printing head is shifted in the auxiliary scanning direction for one nozzle pitch, judgment is made whether the abnormal nozzle and the white stripe caused due to the abnormal nozzle overlap or not (S203) as shown in FIG. 5B. If complement is not possible for overlapping, generation of alarm and stopping of printing are performed (S303). On the other hand, when complement is possible for non-overlapping of the faulty nozzle and the white stripe, printing is performed by shifting the printing head $1$ in the primary scanning direction with the image data excluding the image data segment corresponding to the faulty nozzle (S204) Once, forward printing is completed (S205), the printing head $1$ is shifted for one nozzle pitch in the auxiliary scanning direction (S206), the normally operating nozzle is located corresponding to the white line to perform complemental printing by backward scanning of the excluded data (S207). Thus, complemental printing is completed (S208). Then, the printing head is shifted to the original position (S109) as shown in FIG. 5A. The printing medium is then fed for one line in the auxiliary scanning direction (S110). Thereafter, check is performed whether printing data for the next line is present or not (S111). If the printing data for the next line is present, check for the faulty nozzle is performed (S102). On the other hand, if no printing data for the next line is present, a series of printing operation is terminated (S112).

On the other hand, when no faulty nozzle is present, printing is performed by shifting the printing head in the primary scanning direction (S104). When forward printing is completed (S105), the printing head is shifted for one nozzle pitch (S106), and the printing head is shifted in a backward direction (S107). When backward shifting of the printing head is completed (S108), shifting of the printing head is returned to the normal position (S109). Thereafter, the printing medium is fed for one line in the auxiliary scanning direction (S110). Namely, S104 to S108 are corresponded to S204 to S208 and are the same as those except for not handling of the image data.

Next, when complement becomes not possible (S203), the printing head is shifted for further one nozzle pitch (S401) as shown in FIG. 5B. If the white line portion on the printing medium and the faulty nozzle portion of the printing head still overlap (S402), an alarm is generated and printing is stopped (S303). If overlapping of the faulty nozzle and the white line is not caused (S402), printing is performed by shifting the printing head in the primary scanning direction and excluding the image data corresponding to the faulty nozzle (S204), and then the sequence of complemental printing is performed (S205 to S208).

It should be noted that the magnitude of the printing head at step S206 becomes a sum of the shifting magnitudes assumed at steps S203 and S401. The white stripe and the faulty nozzle are not overlapped even by shifting in such extent, an alarm is generated and printing is stopped (S303).

It should be appreciated that while the foregoing discussion has been given with respect to the complemental printing with shifting the printing head for one nozzle pitch, it is of course possible to cause shifting of the printing head in the auxiliary scanning direction for a plurality of nozzle pitches.

Furthermore, in the present embodiment, while the detection of non-ejection failure is performed with respect to each nozzle, it is possible to detect failure by dividing a plurality of nozzles of the printing head in to a plurality of groups and to detect the failure per group. In this case, in order to avoid group including the nozzle, on which failure is caused, the printing head may be shifted to locate the adjacent group to the position corresponding to the white line on the printing head. While certainty of incapability of complement becomes higher, judgment mechanism becomes cheaper and the judgment period becomes shorter.

Figure 6:
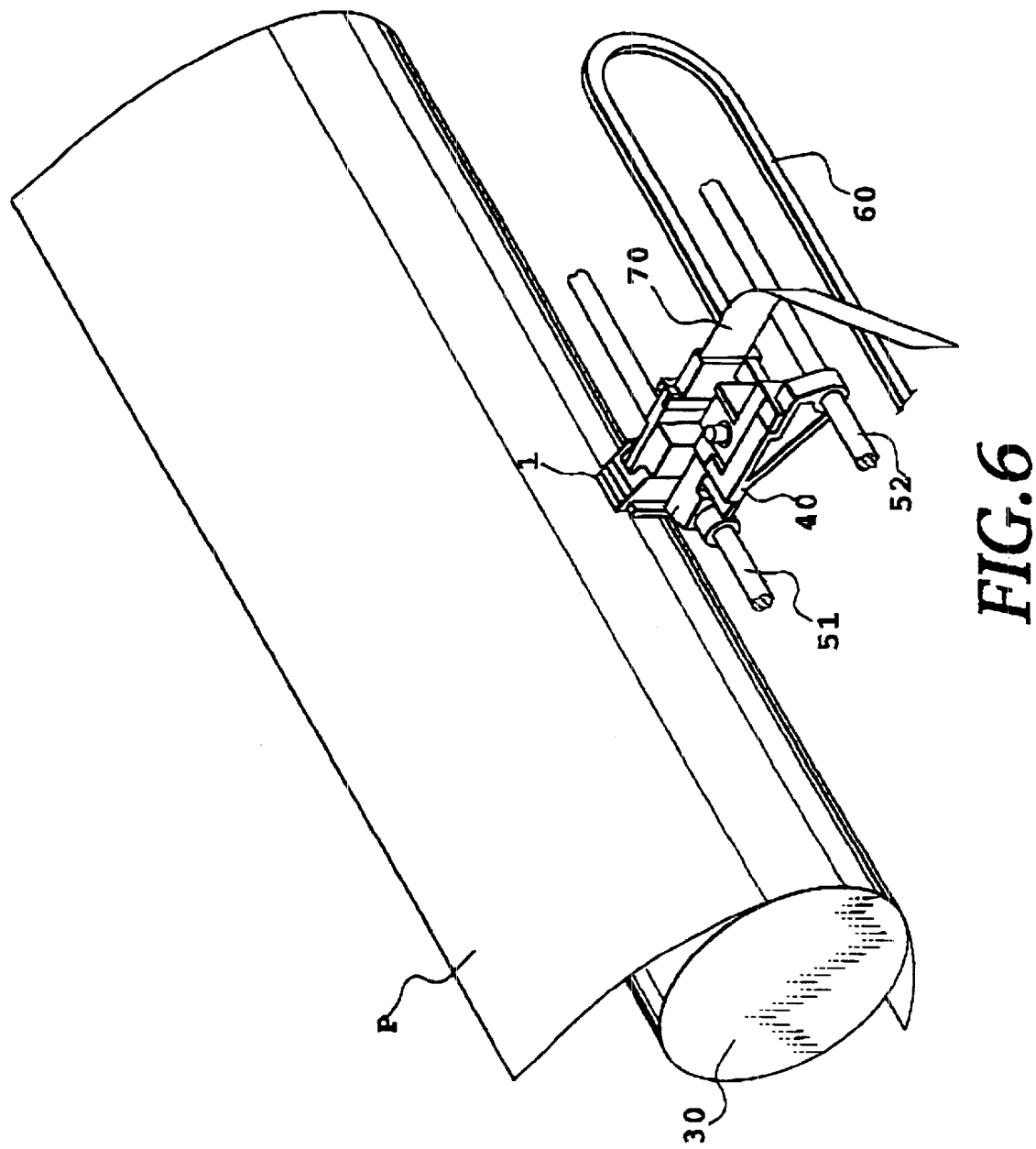
FIG. 6 is a fragmentary perspective view showing the major portion of one embodiment of a printing apparatus according to the invention.

FIG. 6 is a fragmentary perspective view showing the major portion in one embodiment of the printing apparatus according to the present invention. In FIG. 6, in the printing head 1, 128 of ejection openings are provided in an arrangement in the feeding direction of the printing paper P (hereinafter also referred to as auxiliary scanning direction) with 70.5 μm of interval. Corresponding to respective ejection openings, ink passages communicated thereto are provided. Also, heaters for generating thermal energy to be utilized for ink ejection are provided in respective of the ink passages. By this, film boiling is caused and associating with generation of a bubble by film boiling, an ink droplet is ejected through each ejection opening. Also, in the shown printing apparatus, there is provided a mechanism (not shown) as the auxiliary scanning direction for causing slight and precisely shifting in the auxiliary scanning direction and returning to the initial position. Shifting of the printing head 1 is performed with taking one nozzle pitch as a minimum unit, and the shifting magnitude is controlled as required.

A carriage 40 is loaded the printing head 1 and engages with two guide rails 51 and 52 at portions thereof for shifting in the primary scanning direction as guided by the latter. It should be noted that shifting of the carriage 40 is performed by coupling a part thereof with a belt via a pulley and driving the belt by a motor which forms a part of a printing head driving means, via the pulley. These components are neglected from illustration. An ink supply tube 60 is connected to the printing head 1 for supplying the ink from an ink tank (not shown) to the printing head 1. A flexible cable 70 is connected to the printing head 1 for transmitting a drive signal and a control signal on the basis of the printing date from a host system or a control portion of the shown apparatus. The ink supply tube 60 and the flexible cable 70 are formed of flexible material so that they may follow motion of the carriage 40.

A platen roller 30 extends the longitudinal axis thereof in parallel to the guide shafts 51 and 52 and feeds the printing paper P as the printing medium by rotation as driven by a not shown paper feeder motor, and restricts the printing surface. In the construction set forth above, the printing head 1 ejects ink to the portion corresponding to the ejection openings associating with shifting of the carriage and thus to perform printing.

Figure 7:
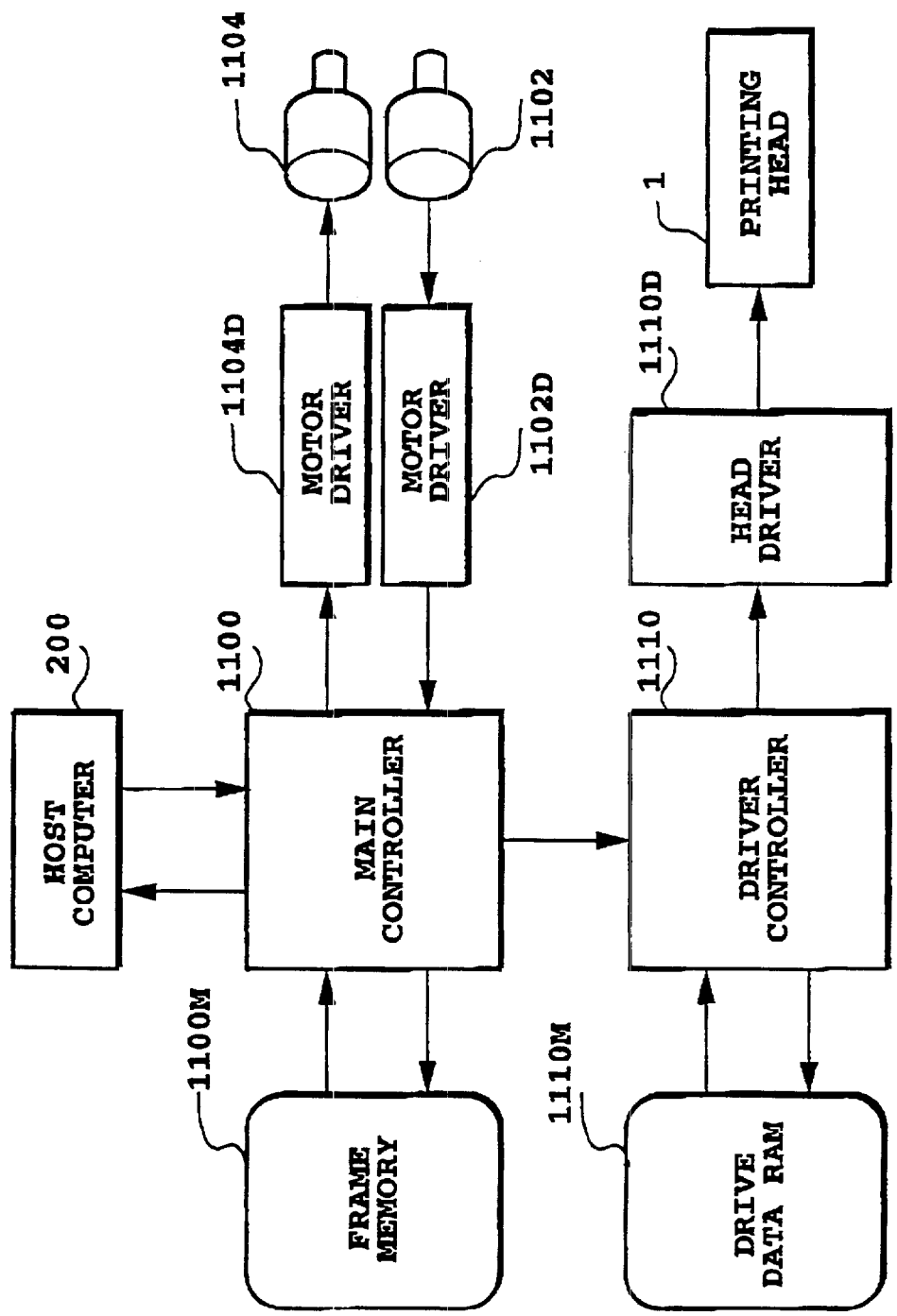
FIG. 7 is a block diagram showing a construction of the control system of the printing apparatus shown in FIG. 6.

FIG. 7 is a block diagram showing a construction of a control system for the printing apparatus shown in FIG. 7.

A main controller 1100 comprises a CPU or so forth and stores the image data transmitted from a host computer 200 in a frame memory 1100M. Also, the main controller 1100 supplies the image data stored in the frame memory 1100M to a driver controller 1110 at a predetermined timing. The driver controller 1110 converts the supplied image data into a drive data (data indicative of ON and OFF of the heater in the printing head 1) corresponded to ejection opening number (representative of the position of the ejection opening in an ejection opening array of the printing head 1) and a scan number (representative of scanning cycle for printing the corresponding part of the image). The driving data is stored in a driving data RAM 1110M. The driver controller 1110 is responsive to the control signal from the main controller 1100 to read out the driving data stored in the driving data RAM 1110M with reference to the ejection opening number and the scanning number for supplying to a head driver 1110D and controlling driving timing of the latter. On the other hand, among a plurality of nozzles (ejection openings) of the printing head 1, data concerning the nozzle on which failure is caused is also stored in the frame memory 1100M by the main controller 1100. Upon forward scanning, the image data segment corresponding to the faulty nozzle is separated from another segment of the image data so as not to be supplied to the driver controller 1110 during forward scanning and to be supplied to the driver controller 1110 during return scanning. Between the forward scanning and return scanning, the printing head is shifted for the given magnitude in the auxiliary scanning direction. During an interval between return scanning and feeding of the printing paper in the auxiliary scanning direction, the shifting of the printing head is returned to the normal position.

In the construction set forth above, the main controller 1100 controls ink ejection by the printing head, revolution of a carriage driving motor 1104, revolution of the paper feeder motor 1102 via respectively corresponding driver controller 1110, a motor driver 1104D and a motor driver 1102D. By this, character, image and so forth corresponding the image data can be printed on the printing paper P.

As a construction for shifting the printing head in a magnitude corresponding to the pitch between the nozzles in advance of complemental printing may be a construction for feeding the printing medium in an appropriate amount employing the mechanism for feeding the printing medium. It is also possible to separately provide a mechanism for shifting the printing the printing head per se may be provided around the printing head so that the printing head is shifted in an appropriate amount. Either case is applicable for the present invention. However, in case of the textile printing employing the ink-let system, since the printing medium is a large size cloth to make the transporting system large to make it difficult to perform a transporting operation in the extent of several tens μm. In such case, by providing the mechanism for shifting the printing head per se in the auxiliary scanning direction, shifting in the appropriate amount becomes possible.

The present invention achieves a distinct effect when applied to a recording head or a recording apparatus which has means for generating thermal energy such as electrothermal transducers or laser light, and which causes changes in ink by the thermal energy so as to eject ink This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C. to 70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

In the present invention, even if any of ejection means as a plurality of printing elements causes the faulty such as poor-ejection or non-ejection failure, a non-printed portion on the printing medium can be printed by a normal printing element, and an image defect caused by such failure can be complemented to obtain an high definition image.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printing apparatus for printing an image using a printing head having a plurality of printing elements disposed in an array, comprising:

main scanning means for performing a main scan of the printing head in a forward scanning direction relative to a printing medium;

printing head driving means for driving said printing elements of said printing head, during the main scan of said printing head by said main scanning means, to form an image on the printing medium, and for printing with printing elements of the plurality of printing elements excluding at least one printing element disposed on at least one end of the array of said plurality of printing elements;

auxiliary scanning means for performing auxiliary scanning of said printing head in an auxiliary scanning direction different than the direction of main scanning relative to said printing medium; and printing control means for performing complementary printing by another printing element of the plurality of printing elements at a printing region of said printing medium corresponding to an abnormal printing element of said plurality of printing elements which cannot perform printing in the forward scanning direction such that said printing head and said printing medium are relatively shifted by said auxiliary scanning means by a shifting distance of at least a pitch between said printing elements of said printing head, wherein the shifting distance by said auxiliary scanning means varies, the shifting distance being determined in accordance with a position of the abnormal printing element of the plurality of printing elements and wherein after a shifting, said printing control means performs complementary printing by using a printing element of the plurality of printing elements, which corresponds to the printing region corresponding to an abnormal printing element before the shifting.

2. A printing apparatus as claimed in claim 1, further comprising shifting means for shifting said printing medium relative to said printing head in the auxiliary scanning direction, wherein an amount of the shifting of said printing head in the auxiliary scanning direction depends upon the pitch between the printing elements and is performed by said auxiliary scanning means.

3. A printing apparatus as claimed in claim 1, further comprising said printing head and wherein said plurality of printing elements of said printing head are arranged along the auxiliary scanning direction.

4. A printing apparatus as claimed in claim 3, wherein said printing head performs printing in a width corresponding to a length of an array of the printing elements excluding at least one of opposite ends of the array.

5. A printing apparatus as claimed in claim 3, further comprising abnormality detecting means for detecting the abnormal printing element among the printing elements of said printing head.

6. A printing apparatus as claimed in claim 1, further comprising said printing head and wherein said printing head has ink ejection openings for ejecting ink corresponding to said plurality of printing elements, and within each of said ejection openings, ejection means for ejecting ink is disposed.

7. A printing apparatus as claimed in claim 6, wherein said ejection means is an electrothermal energy transducer applying thermal energy for the ink, and causing state variation in said ink by heat for ejection of the ink.

8. A printing apparatus as claimed in claim 1, wherein said main scanning means performs a main scan relative to a cloth as said printing medium.

9. A printing method for use with a printing head having a plurality of printing elements disposed in an array for printing by repeatedly main scanning the printing head in a forward scanning direction relative to a printing medium, and auxiliary scanning the printing medium in an auxiliary direction different from the main scanning direction relative to the printing head, the printing method comprising the steps of:

printing with printing elements of the plurality of printing elements excluding at least one printing element disposed on at least one end of the array of the plurality of printing elements during a main scan in the forward direction by the printing head, said printing being performed excluding a printing element having a printing failure;

shifting said printing head relative to said printing medium in the auxiliary scanning direction by a distance of at least a pitch between said printing elements of said plurality of printing elements, after said previous printing step is performed wherein the distance is determined based on a position of the printing element having a printing failure;

complementary printing at a printing region of said printing medium corresponding to the printing element having a printing failure by another printing element of said plurality of printing elements when said printing head and said printing medium are shifted by said previous shifting step; and eliminating said shift in said auxiliary scanning direction between said printing head and said printing medium for a next printing scan.

10. A printing method as claimed in claim 9, wherein the shifting of said printing head in the auxiliary scanning direction depends upon the pitch between the printing elements and is performed by said auxiliary scanning means.

11. A printing method as claimed in claim 9, wherein said printing step is performed on the basis of image data excluding an image data segment corresponding to a faulty printing element when failure caused on said faulty printing element is not non-ejecting failure.

12. A printing method as claimed in claim 11, wherein said complementary printing step is performed by reading out an image for said printing element having a printing failure in said printing scan in the forward direction.

13. A printing method as claimed in claim 9, wherein said shifting step includes a judgment step after shifting in the auxiliary scanning direction for said printing head, said judgment step for making judgment whether another printing element of the plurality of printing elements having a printing failure is opposed to said printing region on said printing medium corresponding to the printing element having a printing failure and which cannot perform printing during said printing scan in the forward direction.

14. A printing method as claimed in claim 13, wherein said complementary printing step is performed according to said judgment step when ink ejection is possible for said printing region on said printing medium corresponding to the printing element having a printing failure and which cannot perform printing during said printing scan in the forward direction.

15. A printing method as claimed in claim 13, wherein said complementary printing step is stopped according to said judgment step when ink ejection is not possible for said printing region on said printing medium corresponding to the printing element having a printing failure and which cannot perform printing during said printing scan in the forward direction.

16. A printing method as claimed in claim 15, wherein stopping of said complementary printing step is followed by a warning.

17. A printing method as claimed in claim 13, wherein said complementary printing step is further performed when ink ejection is not possible for said printing region on said printing medium corresponding to the printing element having a printing failure and which cannot perform printing during said printing scan in the forward direction.

18. A printing method as claimed in claim 9, further comprising the step of providing said printing head with ink ejection openings for ejecting ink corresponding to said plurality of printing elements, and within each of said ejection openings, ejection means for ejecting ink is provided.

19. A printing method as claimed in claim 18, further comprising the step of providing said ejection means with an electrothermal energy transducer applying thermal energy for the ink, and causing state variation in said ink by heat for ejection of the ink.

20. A printing method as claimed in claim 9, further comprising the step of providing a cloth as said printing medium.

21. A printing apparatus, comprising:
a printing head including a plurality of printing elements;
main scanning means for performing a main scan of said printing head in a forward scanning direction relative to a printing medium
printing head driving means for driving said printing elements of said printing head, during the main scan of said printing head by said main scanning means, to form an image on the printing medium;
shifting means for shifting said printing head in an auxiliary scanning direction different than the forward scanning direction of said main scanning means, relative to said printing medium;
setting means for setting printing elements excluding at least one printing element disposed on at least one end of an array of the plurality of printing elements as a printing element group used for printing during the main scan in the forward direction;
determining means for determining a distance of shifting which follows said main scan in the forward direction based on a position of a printing element having a printing failure in a plurality of printing elements included in said printing element group, said distance being at least a pitch between said printing elements of said printing head; and
printing control means for performing complementary printing by another printing element of said plurality of printing elements at a printing region of said printing medium corresponding to an abnormal printing element of said printing head which cannot perform printing in the forward direction of the main scan such that said printing head and said printing medium are relatively shifted by said shifting means by the distance determined by the determining means, and then performing next printing such that the shifting of said printing head and said printing medium in the direction of the auxiliary scan is eliminated.

22. A printing apparatus as claimed in claim 21, wherein said printing elements of said printing head are provided along the auxiliary scanning direction.

23. A printing apparatus as claimed in claim 22, wherein said printing head performs printing in a width corresponding to a length of an array of the printing elements excluding at least one of opposite ends of the array.

24. A printing apparatus as claimed in claim 22, further comprising abnormality detecting means for detecting an abnormal printing element among the printing elements of said printing head.

25. A printing apparatus as claimed in claim 21, wherein said main scanning means performs main scan of the printing head having ink ejection openings for ejecting ink corresponding to said plurality of printing elements, and within each of said ejection openings, ejection means for ejecting ink is disposed.

26. A printing apparatus as claimed in claim 25, wherein said ejection means is an electrothermal energy transducer applying thermal energy for the ink, and causing state variation in said ink by heat for ejection of the ink.

27. A printing apparatus as claimed in claim 21, wherein said main scanning means performs main scan of the printing head relative to a cloth used as said printing medium.

28. A printing method for use with a printing apparatus including:
main scanning means for performing main scan of a printing head in a forward scanning direction relative to a printing medium, said printing head having a plurality of printing elements;
printing head driving means for driving said printing elements of said printing head, during main scan of said printing head by said main scanning means, to form an image on the printing medium; and
shifting means for shifting said printing head in an auxiliary scanning direction different than the scanning direction of said main scanning means, relative to said printing medium;
the printing method, comprising the steps of:
setting printing elements excluding at least one printing element disposed on at least one end of an array of the plurality of printing elements as a printing element group used for printing during main scan in the forward direction;
setting a shifting distance of at least a pitch between said printing elements of said printing head for shifting after the main scan in the forward direction based on a position of a printing element having a printing failure in a plurality of printing elements included in said printing element group;
printing with printing elements of the plurality of printing elements excluding the printing element having the printing failure, among a plurality of printing elements during a printing scan in the forward direction by said printing head driven for the main scanning;
shifting said printing head relative to said printing medium by said shifting means by the shifting distance, after said previous printing step is performed;
complementary printing at a printing region of said printing medium corresponding to the printing element of said printing head which caused a failure during printing in the forward direction of the main scan, by another printing element of said plurality of printing elements when said printing head and said printing medium are shifted by said previous shifting step; and eliminating said shift in said auxiliary scanning direction between said printing head and said printing medium for a next printing scan.

29. A printing method as claimed in claim 28, wherein said printing step is performed on the basis of image data excluding an image data segment corresponding to the printing element causing the printing failure if the failure is not a non-ejecting failure.

30. A printing method as claimed in claim 29, wherein said complementary printing step is performed by reading out an image for said faulty printing element excluded in said printing scan in the forward direction.

31. A printing method as claimed in claim 28, wherein said shifting step includes a judgment step after providing a shift in the auxiliary scanning direction for said printing head, said judgment step for making judgment whether another printing element of said plurality of printing elements in failure is opposed to said printing region on said printing medium corresponding to the faulty printing element of said printing head which cannot perform printing during said printing scan in the forward direction.

32. A printing method as claimed in claim 31, wherein said complementary printing step is performed according to said judgment step when ink ejection is possible for said printing region on said printing medium corresponding to the faulty printing element of said printing head which cannot perform printing during said printing scan in the forward direction.

33. A printing method as claimed in claim 31, wherein said complementary printing step is stopped according to said judgment step when ink ejection is not possible for said printing region on said printing medium corresponding to the faulty printing element of said printing head which cannot perform printing during said printing scan in the forward direction.

34. A printing method as claimed in claim 33, wherein stopping of said complementary printing step is followed by a warning.

35. A printing method as claimed in claim 31, wherein said complementary printing step is further performed when ink ejection is not possible for said printing region on said printing medium corresponding to the faulty printing element of said printing head which cannot perform printing during said printing scan in the forward direction.

36. A printing method as claimed in claim 28, further comprising the step of providing said printing head with ink ejection openings for ejecting ink corresponding to said plurality of printing elements, and within each of said ejection openings, ejection means for ejecting ink is disposed.

37. A printing method as claimed in claim 36, further comprising the step of providing said ejection means with an electrothermal energy transducer applying thermal energy for the ink, and causing state variation in said ink by heat for ejection of the ink.

38. A printing method as claimed in claim 28, wherein a cloth is used as said printing medium.

* * * * *

UNITED STATES PATENT AND TRADEMARK OFFICE
CERTIFICATE OF CORRECTION

PATENT NO. : 6,520,623 B2
DATED : February 18, 2003
INVENTOR(S) : Hiroyuki Miyake et al.

It is certified that error appears in the above-identified patent and that said Letters Patent is hereby corrected as shown below:

Title page,
Item [56], References Cited, FOREIGN PATENT DOCUMENTS,

"54056847" should read -- 54-056847 --;
"59123670" should read -- 59-123670 --;
"59138461" should read -- 59-138461 --;
"60071260" should read -- 60-071260 --;
"62053492" should read -- 62-053492 --;
"63254050" should read -- 63-254050 --;
"63260448" should read -- 63-260448 --;
"3046589" should read -- 3-046589 --;
"53-01340" should read -- 5-301340 --;
"5301427" should read -- 5-301427 --;
"80-25700" should read -- 8-025700 --; and
"JP 6079956 3/1994" should be deleted.

Column 1,
Line 24, "ejection" should read -- ejection, --;
Line 43, "proportionally." should read -- proportionally --;
Line 45, "image," should read -- image. --; and
Line 58, "to." should read -- to --.

Column 8,
Line 7, "the." should read -- the --;
Line 33, "inks," should read -- ink, --; and
Line 53, "al" should read -- a1 --.

Column 9,
Line 61, "while" should read -- white --.

Column 11,
Line 9, "2/((m-1)." should read -- 2/(m-1). --;
Line 11, "(m-3)/(M-1)" should read -- (m-3)/(m-1) --;
Line 31, " {m-(n-1)." should read --{m-(n-1)}. --;
Line 33, "{m-(n-1)" should read --{m-(n-1)} --; and
Line 67, "one." should read -- one --.

UNITED STATES PATENT AND TRADEMARK OFFICE
CERTIFICATE OF CORRECTION

PATENT NO.    : 6,520,623 B2
DATED         : February 18, 2003
INVENTOR(S)   : Hiroyuki Miyake et al.

It is certified that error appears in the above-identified patent and that said Letters Patent is hereby corrected as shown below:

Column 12,
Line 51, "(S204)" should read -- (S204). --.

Column 15,
Line 14, "eject ink" should read -- eject ink. --.

Signed and Sealed this

Twenty-third Day of March, 2004

JON W. DUDAS
*Acting Director of the United States Patent and Trademark Office*